(12) United States Patent
Riise et al.

(10) Patent No.: US 7,958,228 B2
(45) Date of Patent: Jun. 7, 2011

(54) BEHAVIORAL PREDICTIONS BASED ON NETWORK ACTIVITY LOCATIONS

(75) Inventors: Soren Riise, Cupertino, CA (US);
Devesh Patel, Cupertino, CA (US);
Ramesh G. Pai, San Jose, CA (US);
Mark Nicholas Law, Gilroy, CA (US)

(73) Assignee: Yahoo! Inc., Sunnyvale, CA (US)

( * ) Notice: Subject to any disclaimer, the term of this patent is extended or adjusted under 35 U.S.C. 154(b) by 836 days.

(21) Appl. No.: 11/776,488

(22) Filed: Jul. 11, 2007

(65) Prior Publication Data
US 2009/0019182 A1 Jan. 15, 2009

(51) Int. Cl.
*G06F 15/173* (2006.01)
(52) U.S. Cl. .... 709/224; 709/245; 709/226; 379/106.02
(58) Field of Classification Search .................. 709/224
See application file for complete search history.

(56) References Cited

U.S. PATENT DOCUMENTS

| | | | | |
|---|---|---|---|---|
| 5,835,087 | A * | 11/1998 | Herz et al. .................. 715/810 |
| 6,654,735 | B1 * | 11/2003 | Eichstaedt et al. ............ 707/749 |
| 7,031,961 | B2 * | 4/2006 | Pitkow et al. ........................ 1/1 |
| 7,617,160 | B1 * | 11/2009 | Grove et al. .................. 705/500 |
| 7,853,469 | B2 * | 12/2010 | Maitland et al. .................. 705/8 |
| 2001/0013123 | A1 * | 8/2001 | Freeman et al. ................ 725/34 |
| 2001/0036224 | A1 * | 11/2001 | Demello et al. ............. 375/220 |
| 2002/0016786 | A1 * | 2/2002 | Pitkow et al. ..................... 707/3 |
| 2002/0073419 | A1 * | 6/2002 | Yen et al. ......................... 725/23 |
| 2002/0111172 | A1 * | 8/2002 | DeWolf et al. ................. 455/456 |
| 2002/0184080 | A1 * | 12/2002 | Murad et al. .................... 705/10 |
| 2002/0188507 | A1 * | 12/2002 | Busche ........................... 705/14 |
| 2003/0083938 | A1 * | 5/2003 | Smith et al. ..................... 705/14 |
| 2003/0195694 | A1 * | 10/2003 | Kozak et al. .................. 701/200 |
| 2004/0068582 | A1 * | 4/2004 | Anderson et al. ............. 709/245 |
| 2005/0197954 | A1 * | 9/2005 | Maitland et al. ................ 705/39 |
| 2006/0212601 | A1 * | 9/2006 | Hampton ...................... 709/245 |
| 2007/0021973 | A1 * | 1/2007 | Stremler ........................... 705/1 |

(Continued)

FOREIGN PATENT DOCUMENTS
WO WO 2006/057048 6/2006

OTHER PUBLICATIONS
International Search Report from PCT/US2008/067902, mailed Jan. 23, 2009.

(Continued)

*Primary Examiner* — Firmin Backer
*Assistant Examiner* — Hamza Algibhah
(74) *Attorney, Agent, or Firm* — Weaver Austin Villeneuve and Sampson LLP

(57) ABSTRACT

A computer-implemented method for constructing network activity profiles is provided, which comprises the following: obtaining a plurality of records of network activities from an activity source, each record corresponding to an interaction with a network resource via the network from the activity source, wherein each record comprises at least a network endpoint address from where the interaction originates and an indication of a time of the interaction; for each record, determining a geographical location corresponding to the network endpoint address of that record and associating the determined geographical location with that record; and constructing at least one profile for the activity source based on the plurality of records and at least one geographical location associated with the records, wherein each profile comprises a time-based behavior pattern associated with the at least one geographical location.

24 Claims, 7 Drawing Sheets

U.S. PATENT DOCUMENTS

| | | | |
|---|---|---|---|
| 2007/0206741 A1* | 9/2007 | Tiliks et al. | 379/106.02 |
| 2007/0250628 A1* | 10/2007 | Katoh et al. | 709/225 |
| 2008/0015878 A1* | 1/2008 | Feng et al. | 705/1 |
| 2008/0086473 A1* | 4/2008 | Searl et al. | 707/9 |
| 2008/0133311 A1* | 6/2008 | Madriz Ottolina | 705/10 |
| 2008/0181179 A1* | 7/2008 | Karaoguz | 370/331 |
| 2009/0132345 A1* | 5/2009 | Meyssami et al. | 705/10 |
| 2009/0150238 A1* | 6/2009 | Marsh et al. | 705/14 |
| 2010/0151817 A1* | 6/2010 | Lidstr m et al. | 455/405 |

OTHER PUBLICATIONS

Written Opinion from PCT/US2008/067902, mailed Jan. 23, 2009.
U.S. Appl. No. 11/729,364, entitled "System and Method for Associating a Geographical Location with an Internet Protocol Address".
U.S. Appl. No. 11/729,365, entitled "System and Method for Associating a Geographical Location with an Internet Protocol Address".

* cited by examiner

US 7,958,228 B2

BEHAVIORAL PREDICTIONS BASED ON NETWORK ACTIVITY LOCATIONS

BACKGROUND OF THE INVENTION

1. Field of the Invention

The present invention relates to systems and methods for predicting future behaviors based on past network activities. More specifically, the present invention relates to systems and methods for constructing time-based behavior pattern profiles with respect to one or more geographical locations based on past network activities and predicting future behavior patterns based on the profiles.

2. Background of the Invention

The Internet has brought new opportunities to businesses around the world. Most importantly, geographical locations are no longer a significant restriction or limitation when conducting business transactions. More and more consumers enjoy the convenience of purchasing services and/or merchandise on the Internet from companies both close and afar, and consequently have much greater selections of services and/or merchandise to choose from. Many purely Internet-based companies have grown over the years into successful international corporations. These companies provide various types of services and/or merchandise on the Internet. For example, Yahoo!® Inc., one of the well-known Internet services companies, provides a full range of products and services, such as search engine, electronic mail (e-mail), news, message, travel, etc., to millions of people around the world.

Naturally, Internet-based companies conduct their business via the Internet: services are provided over the Internet, merchandise is sold over the Internet, information is exchanged over the Internet, etc. Often, these are done through the World Wide Web and/or emails. For example, people may access Yahoo!® search engine, Yahoo!® Mail, and other Yahoo!® services and/or products using a web browser, such as Windows Internet Explorer developed by Microsoft® Corp. or Firefox® developed by Mozilla® Corp. It is no longer relevant where a person is located in the physical world, for as long as the person has access to the Internet, the person has access to the services, merchandise, and information provided online by the companies.

On the other hand, the types of services and/or information a person desires or needs often depends the person's physical location at a given time. For example, when a person is working, he or she may search for work-related information on the Internet. When a person is shopping, he or she may desire information on discounts or special deals offered by the stores nearby. When a person is traveling, he or she may need information on the destination, such as maps, tourist attractions, hotels, restaurants, transportations, etc.

In order to better serve their customers, it may be desirable if the companies are able to provide services and/or information tailored specifically to the needs of the customers based on where the customers are located, what the customers are doing, and other relevant factors at a particular time. For example, if a customer is shopping at a local grocery store, it may be desirable to send that customer information on products offered at that grocery store. In addition, it may also be desirable if the companies are able to anticipate the future needs of the customers and provide the appropriate information and/or services to the customers based on the expected future needs at the appropriate times. For example, if a customer generally takes a vacation every year during the summer months, it may be desirable to provide that customer with tourism information, such as possible vacation destinations or vacation package offers, shortly before each summer season.

Accordingly, what are needed are systems and methods to address the above-identified issues.

SUMMARY OF THE INVENTION

Broadly speaking, the present invention relates to systems and methods for predicting future behaviors based on past network activities.

In one embodiment, a computer-implemented method for constructing network activity profiles is provided, which comprises the following: obtaining a plurality of records of network activities from an activity source, each record corresponding to an interaction with a network resource via the network from the activity source, wherein each record comprises at least a network endpoint address from where the interaction originates and an indication of a time of the interaction; for each record, determining a geographical location corresponding to the network endpoint address of that record and associating the determined geographical location with that record; and constructing at least one profile for the activity source based on the plurality of records and at least one geographical location associated with the records, wherein each profile comprises a time-based behavior pattern associated with the at least one geographical location.

In another embodiment, a computer-implemented method for predicting future behaviors, which comprises the following: constructing at least one profile for an activity source based on a plurality of records of network activities from the activity source and at least one geographical location associated with the records, wherein each record corresponds to an interaction with a network resource via the network originated from one of the at least one geographical location from the activity source, and each profile comprises a time-based behavior pattern associated with the at least one geographical location; and predicting future behaviors of the activity source based on the at least one profile.

In another embodiment, a computer program product for constructing network activity profiles comprising a computer-readable medium having a plurality of computer program instructions stored therein is provided. The plurality of computer program instructures are operable to cause at least one computing device to: obtain a plurality of records of network activities from an activity source, each record corresponding to an interaction with a network resource via the network from the activity source, wherein each record comprises at least a network endpoint address from where the interaction originates and an indication of a time of the interaction; for each record, determine a geographical location corresponding to the network endpoint address of that record and associating the determined geographical location with that record; and construct at least one profile for the activity source based on the plurality of records and at least one geographical location associated with the records, wherein each profile comprises a time-based behavior pattern associated with the at least one geographical location.

In another embodiment, a computer program product predicting future behaviors comprising a computer-readable medium having a plurality of computer program instructions stored therein, which are operable to cause at least one computing device to: construct at least one profile for an activity source based on a plurality of records of network activities from the activity source and at least one geographical location associated with the records, wherein each record corresponds to an interaction with a network resource via the network originated from one of the at least one geographical location from the activity source, and each profile comprises a time-based behavior pattern associated with the at least one geographical location; and predict future behaviors of the activity source based on the at least one profile.

These and other features, aspects, and advantages of the invention will be described in more detail below in the detailed description and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
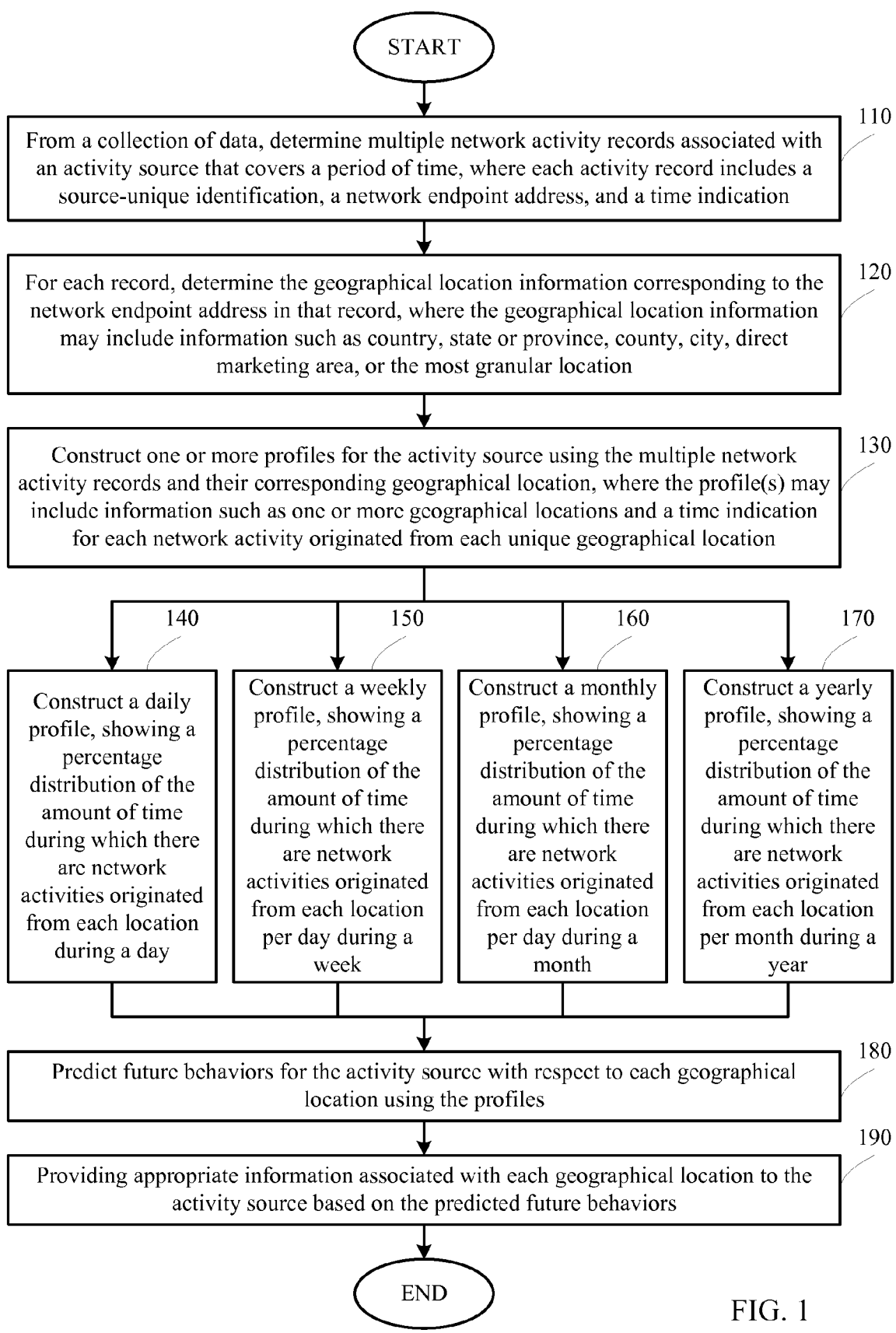
FIG. 1 is a flowchart of a method that constructs network activity profiles representing time-based behavior patterns with respect to geographical locations and predicts future behaviors based on the profiles.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. In addition, while the invention will be described in conjunction with the particular embodiments, it will be understood that it is not intended to limit the invention to the described embodiments. To the contrary, it is intended to cover alternatives, modifications, and equivalents as may be included within the spirit and scope of the invention as defined by the appended claims.

The Internet may be accessed from different geographical locations around the world using various methods. Sometimes, certain methods may be more suitable for accessing particular types of information available on the Internet, while other times one method may be used for accessing different types of information. Similarly, different types of electronic devices may be used to access the Internet. For example, web pages may be viewed using a web browser. Emails may be retrieved and/or sent using a web browser or an email application program. Files may be uploaded and/or downloaded using a web browser or an application program implementing the File Transfer Protocol (FTP). The various types of software programs for accessing the Internet may be executed on a computer or wireless devices such as a personal digital assistant (PDA) or a mobile telephone. The computer may be a desktop computer or a notebook computer. The computer may be connected to the Internet via a cable, such as an Ethernet cable or a telephone cable, or wirelessly through various types of networks. The PDA or the mobile telephone usually connect to the Internet wirelessly but may also be through various types of networks, such as a mobile telephone network.

Each time a person interacts with or accesses the Internet, a record may be made of the network activities conducted by the person. The record may include various pieces of information describing the person's network activities. For example, a unique identification (ID) may indicate the source of the network activities; a network endpoint address, such as an Internet Protocol (IP) address, may indicate from where the Internet interaction originates; and an indication of time, such as a timestamp, may indicate when the network activities are conducted. Other relevant information may also be included in the record.

There may be different types of Internet access or activities source, and examples may include the person interacting with the Internet, the web browser used by the person to access the Internet, etc. In one or more embodiments, a unique cookie may be assigned to each web browser, and if the person uses a web browser to access the Internet (e.g., viewing web pages), a browser-unique cookie may be used identify the web browser, which is one type of Internet interaction source. Similarly, people may establish online accounts (i.e., user accounts) at various websites, and a unique cookie may be assigned to each user account. If the person logs into his or her online account at a particular website, the user account-unique cookie may be used to identify the person conducting the network activities.

Over time, records of Internet interactions or activities may be collected and stored, and profiles may be constructed for the activity sources based on their respective network activity records. Each profile may describe a time-based behavior pattern for a particular activity source. Furthermore, these profiles may be used to predict future behaviors for the activity sources.

FIG. 1 is a flowchart of a method that constructs network activity profiles representing time-based behavior patterns with respect to geographical locations and predicts future behaviors based on the profiles. At 110, from a collection of data, multiple network activity records associated with an activity source may be determined. The records may cover a period of time. And each network activity record may include an activity source-unique ID, a network endpoint address, and a time indication.

Raw data describing a person's interaction with the Internet may be collected and stored for a particular period of time. These data may include unique IDs identifying the source of the Internet interactions (e.g., browser-unique cookies or user account-unique cookies), network endpoint addresses from where the Internet interactions originate (e.g., IP addresses), time indications indicating when the Internet interactions occur (e.g., timestamps), and other relevant information. There are different methods for collecting such data. For example, a particular website may implement software programs of specific functionalities for collecting and storing the data whenever people access that website.

The collected raw data may need to be processed first (e.g., filtered, categorized, correlated, aggregated, etc.) to obtain the network activity records. For example, each set of IP address and timestamp is associated with the appropriate activity source ID. Duplicate pieces of data and/or irrelevant data are filtered out and discarded or ignored. Again, appropriate functionalities may be implemented using software programs. By processing the raw data, multiple network activity records may be obtained, and each record may include an activity source ID, an IP address, and a timestamp.

The following table, Table 1, includes several sample representations of the network activity records for a particular activity source.

TABLE 1

Sample Network Activity Records

| Activity Source ID | IP Address | Timestamp |
|---|---|---|
| 61867037 | 216.109.112.135 | 2007-01-05 10:43:20 |
| 61867037 | 216.109.112.135 | 2007-01-12 18:51:12 |
| 61867037 | 209.73.168.74 | 2007-01-31 16:15:25 |
| 61867037 | 124.83.139.192 | 2007-02-10 23:54:14 |
| 61867037 | 124.83.139.192 | 2007-02-17 12:42:21 |
| 61867037 | 216.109.112.135 | 2007-02-21 09:04:14 |
| 61867037 | 209.73.168.74 | 2007-03-03 09:52:31 |
| 61867037 | 216.109.112.135 | 2007-03-17 14:20:30 |
| 61867037 | 124.83.139.192 | 2007-03-28 08:35:40 |

In Table 1, each row represents a sample network activity record consisting of an activity source ID, an IP address, and a timestamp. The activity source ID shown in Table 1 may be a web browser-unique cookie or a user account-unique cookie. If the activity source ID is a web browser-unique cookie, it indicates a particular web browser has been used to access the Internet. Since generally a particular web browser is executed on the same electronic device (e.g., computer or PDA), this implies that the same electronic device has been used to interact with the Internet. However, different people may share that particular device and use the same web browser to access the Internet at different times. Thus, in this case, the records may represent network activities conducted by multiple people.

On the other hand, if the activity source ID is a user account-unique cookie, it generally implies that the same person has conducted the network activities represented by the records, since normally only the owner of a user account has the password to that account and may be able to log into the account. However, it is possible, although unlikely, that multiple people may share the same user account or another person may log into the owner's user account without the owner's permission. In this case, it is still possible that the records may represent network activities conducted by multiple people.

The sample records shown in Table 1 describe Internet activities conducted over a period of approximately three months. The timestamps from the records indicate when the network activities occur. Of course different formats may be used to represent the timestamp variable, and the format shown in Table 1 (i.e., year, month, day, hour, minute, and second) is merely an example. It is very likely that different implementations of the method may choose different formats to represent the timestamp variable. In addition, the IP addresses from the records indicate from where the network activities originate. In other words, the IP addresses, which may be either static or dynamic, are the IP addresses assigned to the electronic devices (e.g., router, computer, etc.) used for accessing the Internet.

Once records that cover a period of time are obtained for a particular activity source, at 120, for each record, one or more geographical locations are determined using the IP address belonging to that record. Various methods for determining geographical locations of an IP address are known. For example, various versions of software programs are designed to trace an IP addresses to their corresponding geographical locations. Lookup tables mapping IP addresses to physical locations are often stored on various network servers, particularly servers maintained by Internet Service Providers (ISP), which may be used to look up geographical locations for a given IP address.

Additional examples of systems and methods for associating one or more geographical locations with an IP address are disclosed in U.S. patent application Ser. No. 11/729,365 and U.S. patent application Ser. No. 11/729,364, both titled "System and Method for Associating a Geographical Location with an Internet Protocol Address," which are incorporated by reference to the extent not inconsistent with the claimed aspects and the disclosure herein.

Different levels of precision (i.e., granularity) of geographical locations may be determined for each IP address. For example, a particular IP address may be mapped to a country, a state or province, a county, a city, a street, a specific address, a direct marketing area (DMA), etc. Depending on the requirements or preferences of the specific implementations of the method, one or more geographical locations of different levels of granularity may be determined for each IP address from the network activity records. For example, a particular implementation of the method may choose to always determine the most granular locations possible for the IP addresses, while another implementation may choose to only determine the geographical locations corresponding to the IP addresses within a city. Yet another implementation may choose to determine geographical locations of different precisions for the IP addresses depending on various factors, such as the records available and the behavior profiles to be constructed.

Sometimes, it is also possible for multiple IP addresses to be mapped to the same geographical location, if they are physically located nearby. For example, one city may have multiple ISPs, each having a different IP address. If a person interacts with the Internet through more than one ISP located in the same city, the network activity records may show different IP addresses mapped to the same city.

The determined geographical locations are associated with their corresponding IP addresses and may be stored along with the records. In Table 1, three different IP addresses, 216.109.112.135, 209.73.168.74, and 124.83.139.192, are shown in the records. Two of the IP addresses, 216.109.112.135 and 209.73.168.74, are matched to the same city: United States, California, Sunnyvale, while the third IP address, 124.83.139.192, is located in Japan. The following table, Table 2, shows the records of Table 1 with corresponding geographical locations determined based on the IP addresses. In this example, the geographical locations for each IP address are determined to the most granular level. Thus, for the two IP addresses located in the United States, the corresponding geographical locations are matched to within the city, and for the IP address located in Japan, the corresponding geographical location is matched only to within the country.

TABLE 2

Sample Network Activity Records with Geographical Locations

| Activity Source ID | IP Address | Timestamp | Geographical Locations |
|---|---|---|---|
| 61867037 | 216.109.112.135 | 2007-01-05 10:43:20 | United States; California; Sunnyvale |
| 61867037 | 216.109.112.135 | 2007-01-12 18:51:12 | United States; California; Sunnyvale |

TABLE 2-continued

Sample Network Activity Records with Geographical Locations

| Activity Source ID | IP Address | Timestamp | Geographical Locations |
|---|---|---|---|
| 61867037 | 209.73.168.74 | 2007-01-31 16:15:25 | United States; California; Sunnyvale |
| 61867037 | 124.83.139.192 | 2007-02-10 23:54:14 | Japan |
| 61867037 | 124.83.139.192 | 2007-02-17 12:42:21 | Japan |
| 61867037 | 216.109.112.135 | 2007-02-21 09:04:14 | United States; California; Sunnyvale |
| 61867037 | 209.73.168.74 | 2007-03-03 09:52:31 | United States; California; Sunnyvale |
| 61867037 | 216.109.112.135 | 2007-03-17 14:20:30 | United States; California; Sunnyvale |
| 61867037 | 124.83.139.192 | 2007-03-28 08:35:40 | Japan |

Once the geographical locations corresponding to the IP addresses are determined, at 130, one or more profiles for the activity source may be constructed using the network activity records and the geographical locations corresponding to the IP addresses in the records. The profiles describe or represent time-based behavior patterns with respect to the different geographical locations and may include information such as the geographical locations and timestamps indicating the time for the network activities conducted at each of the geographical locations. The profiles may cover different time periods, such as network activities conducted within a day, a week, a month, a year, and any other desirable time periods. Generally, in order to construct a profile covering a specific time period, network activity records should be available covering that time period.

For example, at 140, one or more daily profiles may optionally be constructed, each showing a percentage distribution of the amount of time during which there are network activities originated from each different location during a day. At 150, one or more weekly profiles may optionally be constructed, each showing a percentage distribution of the amount of time during which there are network activities originated from each location per day during a week. At 160, one or more monthly profiles may optionally be constructed, each showing a percentage distribution of the amount of time during which there are network activities originated from each location per day during a month. At 170, one or more yearly profiles may optionally be constructed, each showing a percentage distribution of the amount of time during which there are network activities originated from each location per month during a year. Examples of daily, weekly, monthly, and yearly profiles are explained in more detail below in FIGS. 3-6 respectively.

Based on various types of profiles, at 180, future behaviors for the activity source may be predicted with respect to the geographical locations. For example, based on a daily profile representing network activities during a work day, future behaviors may be predicted for other work days. A similar concept applies to weekly, monthly, and yearly profiles. At 190, appropriate information may be provided to the activity source at the suitable geographical locations during the suitable time periods based on the predicted or expected future behaviors. The appropriateness of the information may depend on the types of predicted future behaviors considered. Again, examples of 180 and 190 will be explained in more detail below in FIGS. 3-6 with respect to the daily, weekly, monthly, and yearly profiles.

Figure 2:
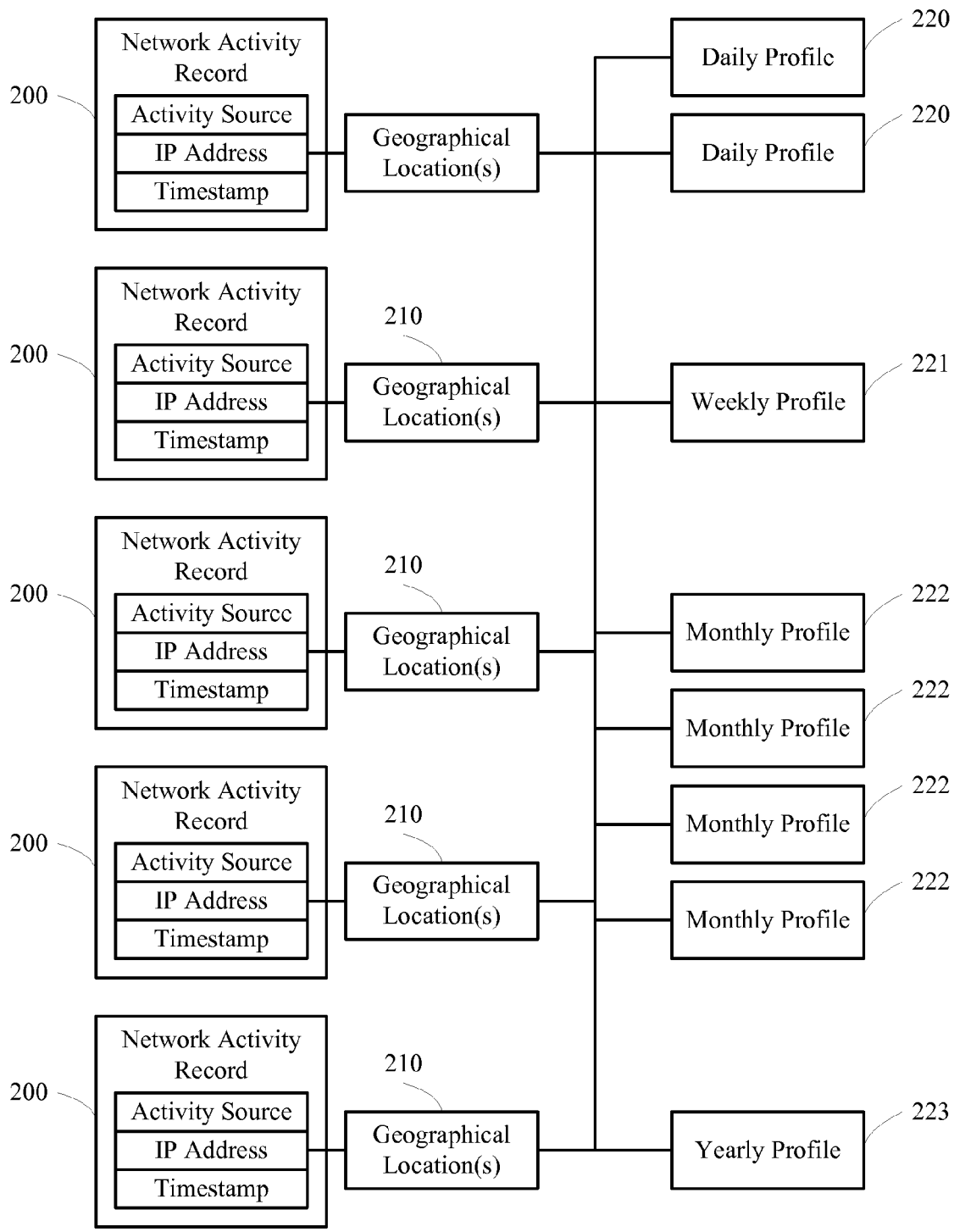
FIG. 2 is a diagram that illustrates relationships between network activity profiles and network activity records.

Different types of profiles (e.g., daily, weekly, monthly, and yearly) may be constructed based on a collection of network activity records covering the appropriate time periods. FIG. 2 is a diagram that illustrates relationships between the network activity records and profiles. To simplify the discussion, only five network activity records 200 are shown in FIG. 2. In practice, it is more likely that hundreds, even thousands of network activity records for a single activity source may be used to construct the profiles for that activity source.

Each network activity record 200 includes at least an indication, such as a unique ID, identifying the activity source, an IP address from where the activity originates, and a timestamp indicating the time of the activity. Of course, other information may also exist in the records. One or more geographical locations 210, perhaps at different levels of precision or granularity, are determined for each IP address and associated with the corresponding record 200. And one or more types of profiles (i.e., daily profile 220, weekly profile 221, monthly profile 222, and/or yearly profile 223) may be constructed based on the records 200 and the corresponding geographical locations 210. Depending on implementation requirements, for example, the same type of profiles 220, 221, 222, 223 may be constructed multiple times, each for a different time period. For example, two daily profiles 220 may be constructed, one representing a weekday and one representing a weekend day. Similarly, twelve monthly profiles 222 may be constructed, each representing a different month of the year.

Information from one or more records may be used to construct the profiles. In other words, information from all the available records is not necessarily always used to generate each profile. Sometimes, for a particular profile, such as a daily profile, only a few records are used. Other times, more records are used, such as for constructing a monthly or yearly profile.

Figure 3A:
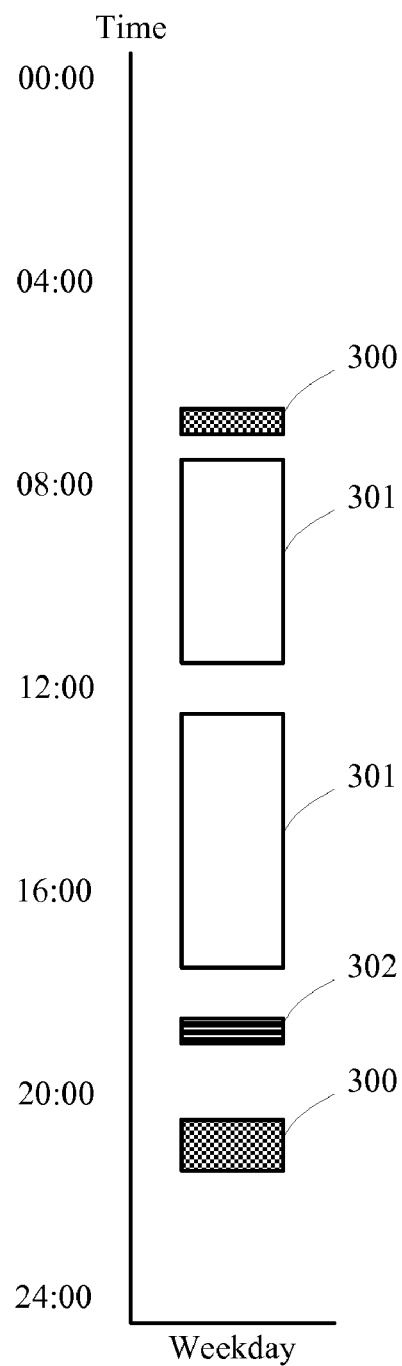
FIGS. 3A and 3B are two graphical illustrations of sample daily profiles.
Figure 3B:
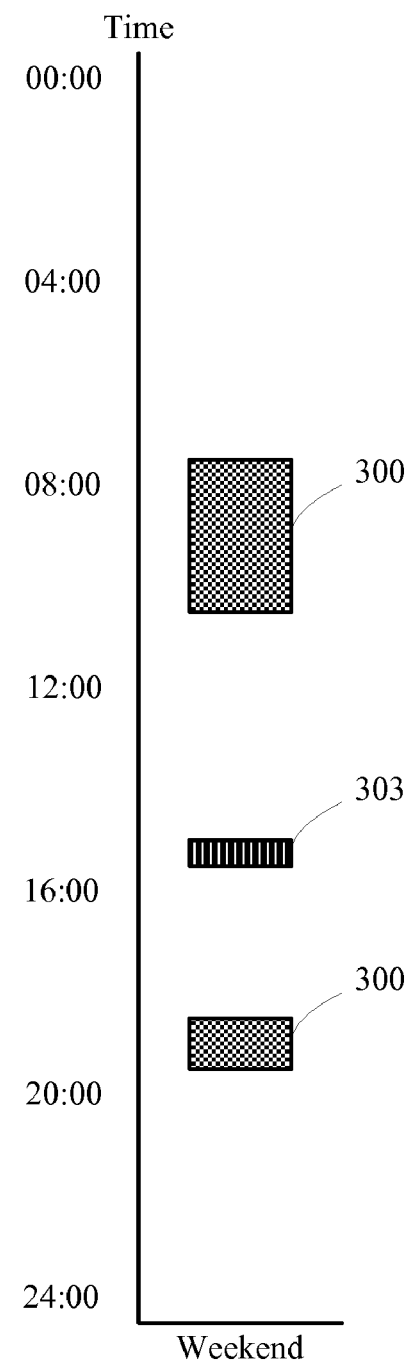

FIGS. 3A and 3B are two graphical illustrations of sample daily profiles. FIG. 3A shows a sample weekday profile, and FIG. 3B shows a sample weekend day profile. Since people are unlikely to be interacting with the Internet all day long, the daily profiles would only show those time periods when the activity source is actually accessing the Internet.

In FIG. 3A, there are five distinct time periods during which the activity source is accessing the Internet: from 07:00 to 07:30, from 08:00 to 12:00, from 13:00 to 18:00, from 19:00 to 19:30, and finally from 21:00 to 22:00. Based on the geographical locations determined using the IP addresses in the network activity records, there are three distinct geographical locations from where the network activities originate. From 07:00 to 07:30 and from 21:00 to 22:00, the activities originate from geographical location 300. From 08:00 to 12:00 and from 13:00 to 18:00, the activities originate from geographical location 301. And from 19:00 to 19:30, the activities originate from geographical location 302.

Assuming the activity source ID is a user account-unique cookie, which generally implies that the network activity records represent a person logging into his or her user account, and since this is a profile for a weekday, the pattern of the network activities may indicate that geographical location 300 may be the person's home, geographical location 301 may be the person's office, and geographical location 302 may be a place where the person goes to after work, such as a restaurant, a coffee shop, a theatre, or a club. Based on the time periods during which there are network activities at each of the distinct geographical locations 300, 301, 302, a percentage distribution of the amount of time during which there are network activities originated from each location during the weekday may be calculated.

Consequently, a time-based behavior pattern may be determined with respect to the distinct geographical locations. In other words, a geographical location may be associated with each period of time when there are network activities. For example, as shown in FIG. 3A, the behavior pattern may indicate that the person leaves home for work around 07:30, spends the majority of the day (i.e., from approximately 8:00 to approximate 18:00) at the office, spends some time out during the evening, and arrives home no later than 21:00.

Of course, there are time periods during the day when there is no network activity from the person, and so no geographical locations are associated with those time periods. For example, early in the morning and late at night, there is no network activity and so no geographical locations are associated with those time periods, most likely because the person is asleep. Similarly, from 12:00 to 13:00 (i.e., the lunch hour) there is no corresponding geographical location, because there is no network activity from the person, perhaps because the person is having lunch.

Based on the daily profile shown in FIG. 3A, future behaviors for activity source during a weekday may be predicted. For example, a person is likely to spend approximately the same period of time at work during each weekday. Similarly, the person is likely to leave home for work and return home at approximately the same time each weekday. It is also possible that the person may frequent a few favorite establishments from time to time (e.g., having dinners at a favorite restaurant or buying grocery from the local grocery store).

Appropriate information corresponding to the person's daily activities may be provided to the person conducting the network activities based on the predicted or expected future behaviors. For example, assuming geographical location 302 is a night club, information may be provided to the person earlier in the afternoon or shortly before the person leaves work about the events that will likely take place at the night club (i.e., geographical location 302) later that evening. Or, if geographical location 302 is a grocery store, information about the special offers at the store may be sent to the person either shortly before the person is likely or expected to go to the store or while the person is likely at the store. If the locations of the person's home and office are known, the route the person takes to and from work may be determined. During early morning and late afternoon on weekdays, traffic information about the route may be provided. Other information relating to daily activities may include weather, news, etc.

There are many ways to send information to a person via the Internet. For example, information may be sent via email, instant message, voice message, etc.

In FIG. 3B, there are three distinct time periods during which the activity source is accessing the Internet: from 08:00 to 11:30, from 15:30 to 16:00, and from 19:00 to 20:00. Again, based on the geographical locations determined using the IP addresses in the network activity records, there are two distinct geographical locations from where the network activities originate. From 08:00 to 11:30 and 19:00 to 20:00, the activities originate from geographical location 300. From 15:30 to 16:00, the activities originate from geographical location 303.

Consequently, the time-based behavior pattern determined from the profile shown in FIG. 3B may indicate that on a weekend day, the person spends the morning at home, goes out in the afternoon, and spends at least some time during the evening again at home. In addition, while a person is having fun, he or she may not access the Internet for long periods of time. The person may only quickly check his or her emails from time to time. Thus, although in FIG. 3B, there are network activities originated from geographical location 303 for approximately half an hour (from 15:30 to 16:00), the person may actually be at geographical location 303 for a much longer time period.

Often, a person's behavior may not be as regular on the weekends as during the week. Nevertheless, it is still possible to predict the person's future behavior pattern, especially if multiple weekend day profiles are used. For example, several weekend day profiles may be constructed, each representing a different weekend day, and future weekend day behaviors may be predicted based on multiple weekend day profiles, perhaps by aggregating or averaging the information from these multiple profiles in order to obtain a more precise behavior pattern.

Thus, several weekend day profiles may together indicate that the person usually goes out in the afternoons on the weekends. Of course, the person may not always visit the same place on every weekend. On some days, the person may visit one place while on other days, the person visit another place. Based on the number of times the person visits each place, it may be determined that the person may visit some places more frequently than others. It may also be determined that the person may always visit a particular place on certain weekend days (e.g., every first Saturday of the month).

Figure 4:
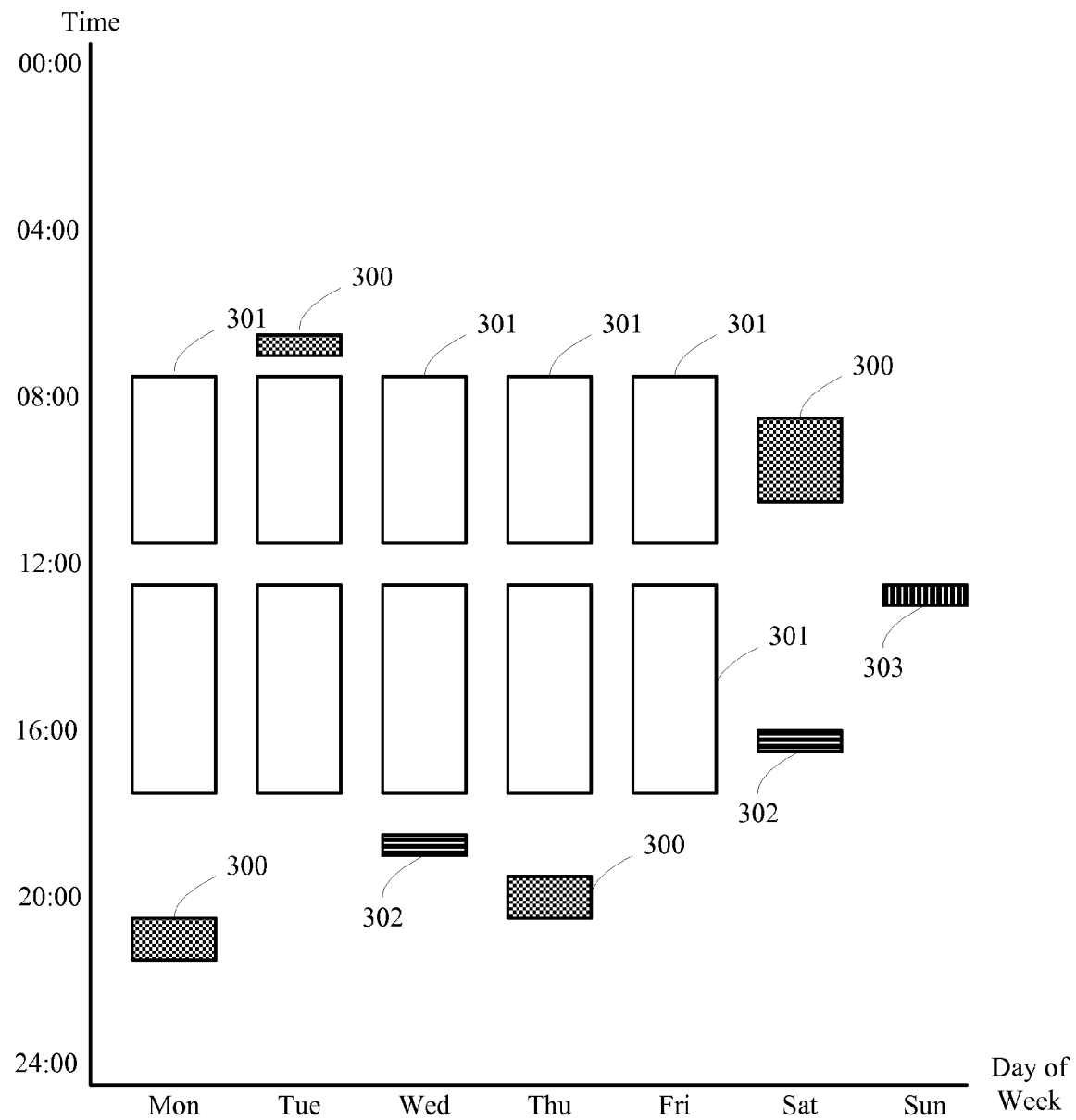
FIG. 4 is a graphical illustration of a sample weekly profile.

The daily profiles show time-based behavior pattern for an activity source during a single day. A weekly profile, on the other hand, shows time-based behavior pattern for an activity source for each day of the week during an entire week. FIG. 4 is a graphical illustration of a sample weekly profile. Time-based distributions for the network activities originated from each of the distinct geographical locations are described for each day of the week. From the sample weekly profile shown in FIG. 4, there appears to be more network activities during the week than on the weekend, perhaps due to the fact that the person often spends time on other activities on the weekends.

During weekdays, the person spends a majority of time at work (i.e., geographical location 301). The person may occasionally go out on weekday evenings. However, on the weekends, the person may visit places for leisure or entertainment more frequently (e.g., geographical locations 302 and 303). Again, future behavior patterns describing the activity source's weekly activities may be predicted using one or more weekly profiles, and information about the person's weekly activities, such as leisure time activities, may be provided to the person based on the predicted or expected future activities.

For example, information about places that the person likes to visit on the weekends may be provided to the person, perhaps on each Friday. If the person frequently goes to a movie theatre on the weekends, information about movies that will be played at the theatre during the upcoming weekend may be sent to the person some time during the week. If the person likes to shop at a mall on the weekends, information about special offers or advertisement from the stores at the mall may be sent to the person at the appropriate time (e.g., either shortly before or while the person is shopping).

Similar to daily profiles, more than one weekly profile may be constructed for an activity source. These multiple weekly profiles may represent different weeks of a month, or weeks of multiple months.

Figure 5:
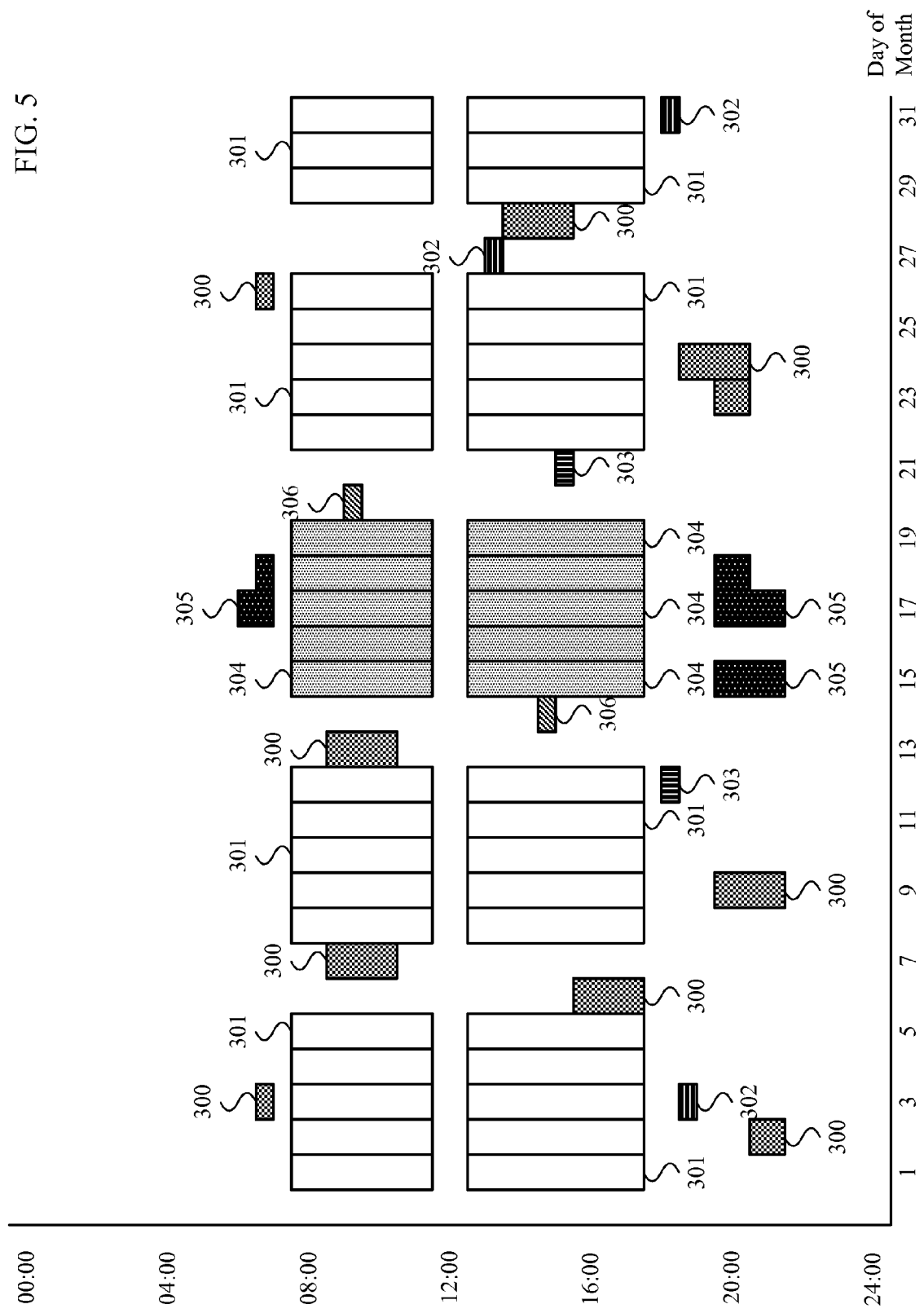
FIG. 5 is a graphical illustration of a sample monthly profile.

To further extend the period of time covered in a profile, FIG. 5 is a graphical illustration of a sample monthly profile. In this case, time distributions for network activities originated from each distinct geographical location are described for each day of the month for an entire month, which in turn shows the behavior pattern of the network activity source during the month.

In the sample profile shown in FIG. 5, during the first, second, and fourth week of the month, the profile indicates that the activity source repeats approximately the same behavior pattern: spending most of the weekdays at the office (geographical location 301), occasionally having some leisure time by visiting various establishments on weekday evenings or weekends (geographical locations 302 and 303), and spending other times at home (geographical location 300).

During the third week of month (from the 14th to the 20th), the profile indicates that the activity source is at a new geographical location 304. This may imply or indicate that the activity source travels to another site, such as a different office location of the company or a customer site, for business on the third week of the week. Thus, geographical location 304 may be the office of the business site the activity source visits, since the activity source is there during normal business hours. Geographical location 305 may be a hotel where the activity source stays during the week, and geographical location 306 may be an airport.

One or more monthly profiles, such as the one shown in FIG. 5, may be used to predict the activity source's future behavior pattern on a monthly basis. For example, the activity source may visit the alternative office site (geographical location 304) to take other business trips periodically, such as once a month or once every few months. Information relating to monthly activities shown in the monthly profile may be provided to the activity source. For example, if based on the monthly profile, it may be predicted that the activity source will take a business trip soon, travel information, such as flights, hotels, restaurants, etc. may be sent to the activity source some time before the scheduled time for the trip.

Similar to daily and weekly profiles, more than one monthly profile may be constructed for an activity source. These multiple monthly profiles may represent different months of a year, or months of different years.

Figure 6:
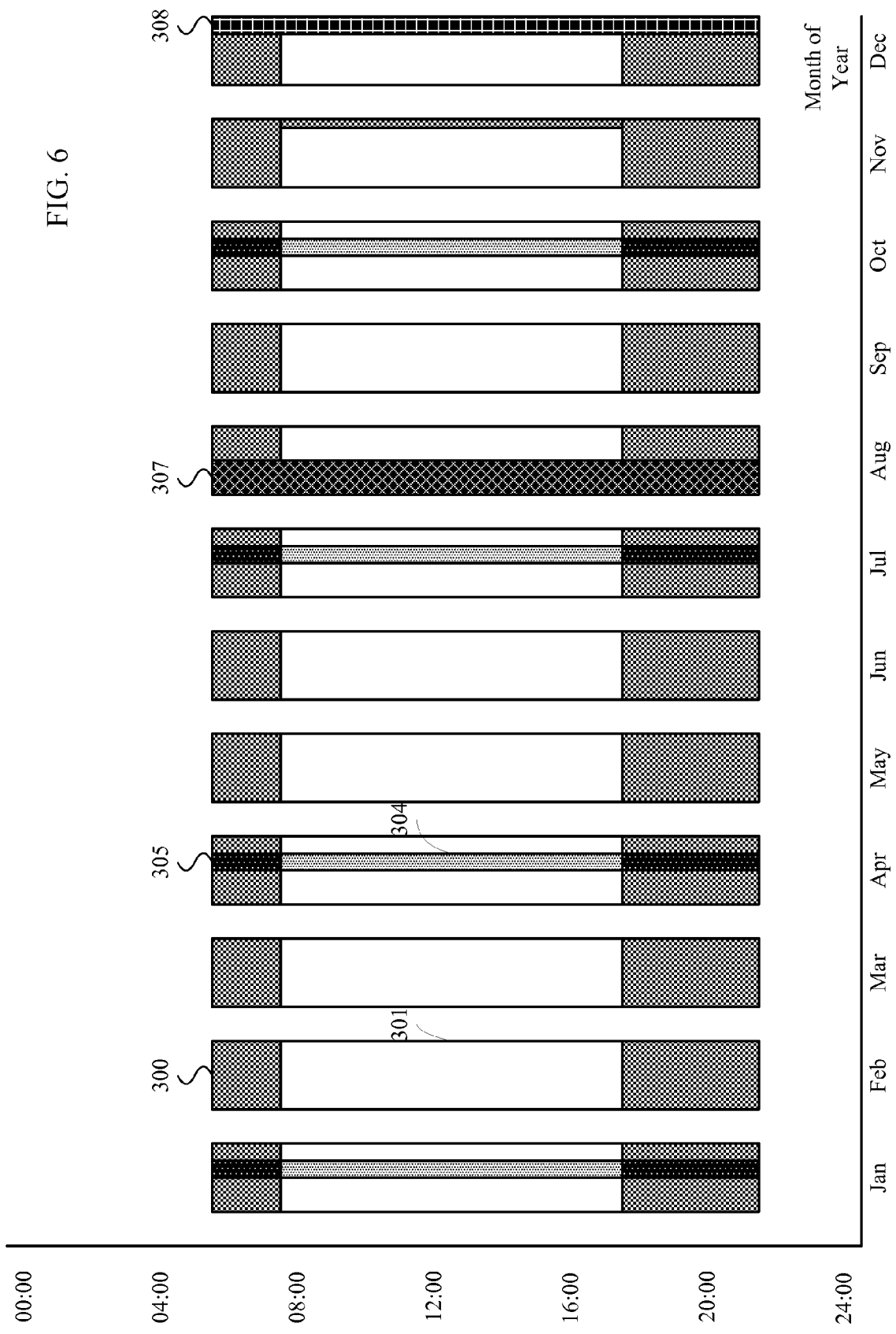
FIG. 6 is a graphical illustration of a sample yearly profile.

FIG. 6 is a graphical illustration of a sample yearly profile. Time distributions for network activities originated from each distinct geographical location are described for each month of the year for an entire year, which in turn shows the behavior pattern of the network activity source during the year. In the sample profile shown in FIG. 6, the activity source normally spends most of the time between home (geographical location 300) and office (geographical location 301). Once every three months, the activity source generally visits an alternative office site (geographical location 304) for a week and stays at a hotel (geographical location 305) during the visit.

During the first two weeks of August, the activity source visits another new geographical location 307. It may be determined that geographical location 307 is a place the activity source visits during vacation time, such as a beach resort or a city in a different country. Similarly, during the last week of December, the activity source also visits a new geographical location 308, which may be a ski resort or a home of a friend of family whom the activity source visits during the holiday season.

Again, the yearly profile may be used to predict future behaviors for the activity source on a yearly basis. Information relating to the activity source's yearly activities may be provided to the activity source at appropriate times. For example, when it gets close to the time when the activity source is expected to take a vacation, tourism related information, such as resorts, possible destinations, flights, hotels, services, etc. may be provided to the activity source. When it gets close to the holiday seasons, information on merchandise as possible gift ideas as well as travel information may be provided to the activity source.

Again, if desirable, multiple yearly profiles, similar to that shown in FIG. 6, may be constructed for an activity source.

Figure 7:
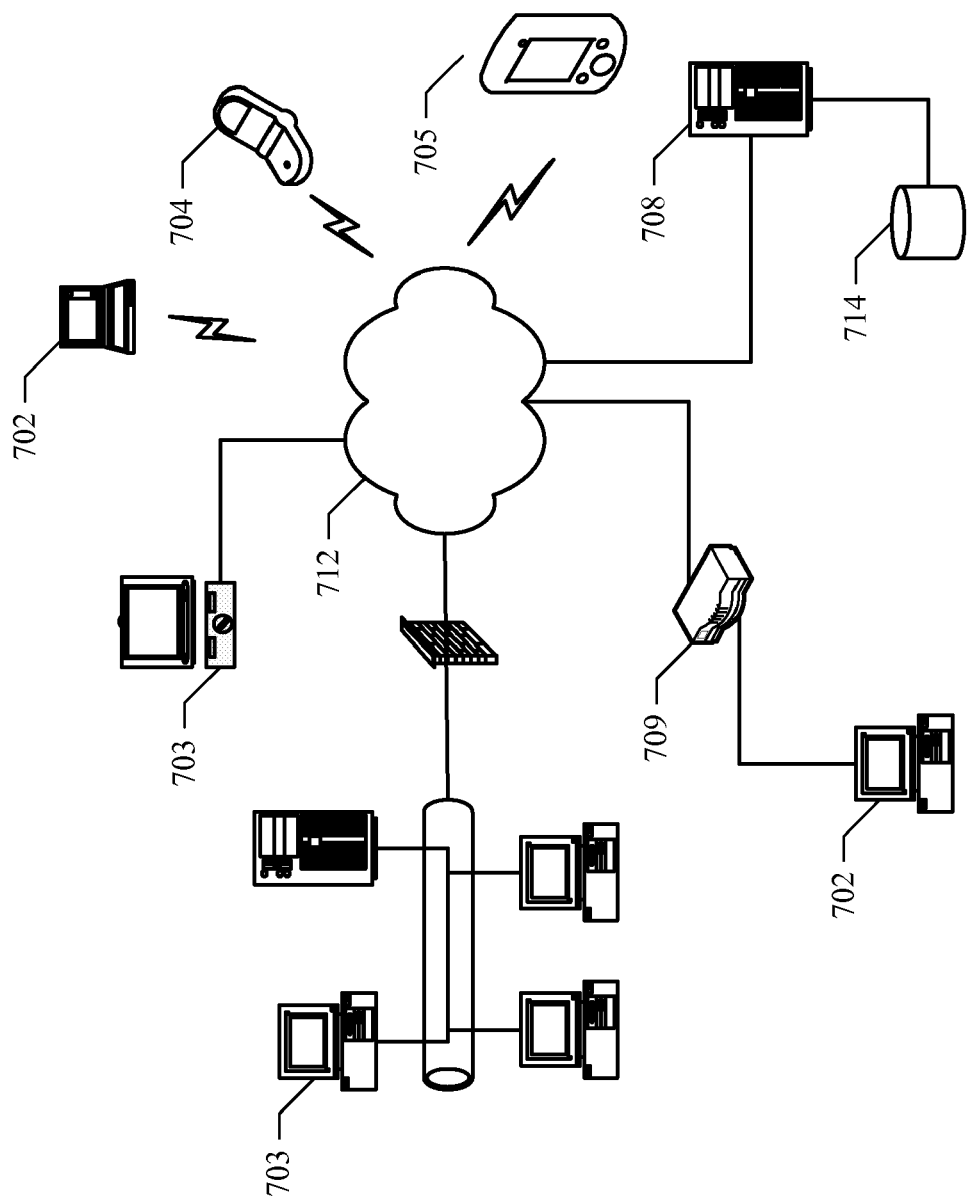
FIG. 7 is a simplified diagram of a network environment in which specific embodiments of the present invention may be implemented.

The method described above in FIG. 1 may be carried out, for example, in a programmed computing system. FIG. 7 is a simplified diagram of a network environment in which specific embodiments of the present invention may be implemented. The various aspects of the invention may be practiced in a wide variety of network environments (represented by network 217) including, for example, TCP/IP-based networks, telecommunications networks, wireless networks, etc. In addition, the computer program instructions with which embodiments of the invention are implemented may be stored in any type of computer-readable media, and may be executed according to a variety of computing models including, for example, on a stand-alone computing device, or according to a distributed computing model in which various of the functionalities described herein may be effected or employed at different locations. The software program implementing various embodiments may be executed on the server 208. For example, websites may be hosted on various servers 708. Software programs designed to collect network activity information (e.g., activity source ID, IP address, timestamp) may be executed on the servers 708 as well. The collected information may be stored in one or more databases 714 communicatively linked to the servers 708

According to various embodiments, interaction with the Internet 712 may be conducted using various devices, such as desktop computers 703, notebook computers 702, mobile telephones 704, PDAs 705, etc. The devices may be connected to the Internet via cables and perhaps through a router 709 or wirelessly. A web browser may be executed on the devices and used to view the web page, each web browser having a unique ID that may be used to identify the web browser (i.e., activity source).

While this invention has been described in terms of several preferred embodiments, there are alterations, permutations, and various substitute equivalents, which fall within the scope of this invention. It should also be noted that there are many alternative ways of implementing the methods and apparatuses of the present invention. It is therefore intended that the following appended claims be interpreted as including all such alterations, permutations, and various substitute equivalents as fall within the true spirit and scope of the present invention.

What is claimed is:

1. A computer-implemented method for constructing network activity profiles, comprising:

obtaining a plurality of records of network activities originating from an activity source, the activity source corresponding to a particular user account, network browser or application program, on the network, and each record corresponding to an interaction by the activity source with a network resource via the network, wherein each record comprises at least a network endpoint address associated with a physical device, the physical device providing access to the network and the network endpoint address used in the interaction between the activity source and the network resource, and wherein each record further comprises an indication of a time of the interaction by the activity source with the network resource;

for each record, determining one or more record geographical locations corresponding to the network endpoint address associated with the physical device by mapping the network endpoint address to the geographical location or locations, wherein the determined record geographical location(s) are based in part on a selected desired level or levels of geographic precision;

associating the determined record geographical location or locations with that record; and constructing at least one profile for the activity source based on the plurality of records and at least one geographical location associated with the plurality of records, wherein each profile comprises a time-based behavior pattern associated with the at least one geographical location.

2. The computer-implemented method, as recited in claim 1, further comprising:

predicting future behaviors of the activity source based on the at least one profile.

3. The computer-implemented method, as recited in claim 1, wherein the time-based behavior pattern associated with the at least one geographical location represents a time distribution for network activities originated from each of the at least one geographical location during a predetermined period of time.

4. The computer-implemented method, as recited in claim 1, wherein the at least one profile comprises a daily profile comprising a time distribution for network behaviors originated from each of the at least one geographical location during a day.

5. The computer-implemented method, as recited in claim 4, wherein the predicting future behaviors of the activity source based on the at least one profile comprises predicting future daily behaviors of the activity source associated with each of the at least one geographical location based on the daily profile.

6. The computer-implemented method, as recited in claim 1, wherein the at least one profile comprises a weekly profile comprising a time distribution for network activities originated from each of the at least one geographical location for each day of a week during the week.

7. The computer-implemented method, as recited in claim 6, wherein the predicting future behaviors of the activity source based on the at least one profile comprises predicting future weekly behaviors of the activity source associated with each of the at least one geographical location based on the weekly profile.

8. The computer-implemented method, as recited in claim 1, wherein the at least one profile comprises a monthly profile comprising a time distribution for network activities originated from each of the at least one geographical location for each day of a month during the month.

9. The computer-implemented method, as recited in claim 8, wherein the predicting future behaviors of the activity source based on the at least one profile comprises predicting future monthly behaviors of the activity source associated with each of the at least one geographical location based on the monthly profile.

10. The computer-implemented method, as recited in claim 1, wherein the at least one profile comprises a yearly profile comprising a time distribution for network activities originated from each of the at least one geographical location for each month of a year during the year.

11. The computer-implemented method, as recited in claim 10, wherein the predicting future behaviors of the activity source based on the at least one profile comprises predicting future yearly behaviors of the activity source associated with each of the at least one geographical location based on the yearly profile.

12. The computer-implemented method, as recited in claim 1, wherein the activity source is one selected from the group consisting of web browser, and user account.

13. The computer-implemented method, as recited in claim 1, wherein the geographical location or locations is one or more selected from the group consisting of country, state, province, county, city, most granular location, or direct market area.

14. The computer-implemented method, as recited in claim 1, wherein the network endpoint address is an IP (Internet Protocol) address and the indication of the time is a timestamp.

15. A computer-implemented method for predicting future behaviors, comprising:

constructing at least one profile for an activity source based on a plurality of records of network activities from the activity source and at least one geographical location associated with the records, the activity source corresponding to a particular user account, network browser or application program, on the network, and wherein each record corresponds to an interaction by the activity source with a network resource via the network originated from a record geographical location corresponding to the network endpoint address in the record, and each record comprises the record geographical location and an indication of a time of the interaction by the activity source with the network resource, the record geographical location determined based at least in part on a network endpoint address associated with a physical device and on a selected desired level of geographic precision, wherein the physical device provides access to the network and the network endpoint address is used in the interaction between the activity source and the network resource; and each profile comprises a time-based behavior pattern associated with the at least one geographical location; and predicting future behaviors of the activity source based on the at least one profile.

16. The computer-implemented method, as recited in claim 15, wherein the predicting future behaviors of the activity source based on the at least one profile comprises predicting future behaviors expected to originate from each of the at least one geographical location based on the time-based behavior pattern associated with that geographical location.

17. The computer-implemented method, as recited in claim 16, further comprising:

providing information associated with each of the at least one geographical location based on the predicted future behaviors expected to originate from that geographical location.

18. The computer-implemented method, as recited in claim 17, wherein the providing information associated with each of the at least one geographical location based on the predicted future behaviors expected to originate from that geographical location comprises for each of the at least one geographical location, providing information based on that geographical location and the predicted future behaviors associated with that geographical location for a time when the predicted future behaviors are expected to originate from that geographical location.

19. The computer-implemented method, as recited in claim 17, wherein the information is at least one selected from the group consisting of advertisement, merchandise offers, service offers, weather information, news, and travel information.

20. The computer-implemented method, as recited in claim 15, wherein the at least one profile comprises
- a daily profile comprising a time distribution for network activities originated from each of the at least one geographical location during a day,
- a weekly profile comprising a time distribution for network activities originated from each of the at least one geographical location for each day of a week during the week,
- a monthly profile comprising a time distribution for network activities originated from each of the at least one geographical location for each day of a month during the month, and
- a yearly profile comprising a time distribution for network activities originated from each of the at least one geographical location for each month of a year during the year.

21. The computer-implemented method, as recited in claim 20, wherein the predicting future behaviors of the activity source based on the at least one profile comprises
- predicting future daily behaviors of the activity source associated with each of the at least one geographical location based on the daily profile,
- predicting future weekly behaviors of the activity source associated with each of the at least one geographical location based on the weekly profile,
- predicting future monthly behaviors of the activity source associated with each of the at least one geographical location based on the monthly profile, and
- predicting future yearly behaviors of the activity source associated with each of the at least one geographical location based on the yearly profile.

22. The computer-implemented method, as recited in claim 20, further comprising:
- providing daily information associated with each of the at least one geographical location based on the predicted daily behaviors expected to originate from that geographical location;
- providing weekly information associated with each of the at least one geographical location based on the predicted weekly behaviors expected to originate from that geographical location;
- providing monthly information associated with each of the at least one geographical location based on the predicted monthly behaviors expected to originate from that geographical location; and
- providing yearly information associated with each of the at least one geographical location based on the predicted yearly behaviors expected to originate from that geographical location.

23. A computer program product for constructing network activity profiles comprising a non-transitory computer-readable medium having a plurality of computer program instructions stored therein, which are operable to cause at least one computing device to:
- obtain a plurality of records of network activities originating from an activity source, the activity source corresponding to a particular user account, network browser or application program, on the network, and each record corresponding to an interaction by the activity source with a network resource via the network, wherein each record comprises at least a network endpoint address associated with a physical device, the physical device providing access to the network and the network endpoint address used in the interaction between the activity source and the network resource, and wherein each record further comprises an indication of a time of the interaction by the activity source with the network resource;
- for each record, determining determine one or more record geographical locations corresponding to the network endpoint address associated with the physical device by mapping the network endpoint address to the geographical location or locations, wherein the determined record geographical location(s) are based in part on a selected desired level or levels of geographic precision;
- associate the determined record geographical location or locations with that record; and
- construct at least one profile for the activity source based on the plurality of records and at least one geographical location associated with the plurality of records, wherein each profile comprises a time-based behavior pattern associated with the at least one geographical location.

24. A computer program product predicting future behaviors comprising a non-transitory computer-readable medium having a plurality of computer program instructions stored therein, which are operable to cause at least one computing device to:
- construct at least one profile for an activity source based on a plurality of records of network activities from the activity source and at least one geographical location associated with the records, the activity source corresponding to a particular user account, network browser or application program, on the network, and wherein each record corresponds to an interaction by the activity source with a network resource via the network originated from a record geographical location corresponding to the network endpoint address in the record, and each record comprises the record geographical location and an indication of a time of the interaction by the activity source with the network resource, the record geographical location determined based at least in part on a network endpoint address associated with a physical device and on a selected desired level of geographic precision, wherein the physical device provides access to the network and the network endpoint address is used in the interaction between the activity source and the network resource, and each profile comprises a time-based behavior pattern associated with the at least one geographical location; and
- predict future behaviors of the activity source based on the at least one profile.

* * * * *